(12) United States Patent
Seitz

(10) Patent No.: US 11,498,474 B2
(45) Date of Patent: Nov. 15, 2022

(54) LOAD BAR FOR A TRUCK TRAILER

(71) Applicant: Strick Trailers, LLC, Fairless Hills, PA (US)

(72) Inventor: Kevin Seitz, Decatur, IN (US)

(73) Assignee: Strick Trailers, LLC, Fairless Hills, PA (US)

( * ) Notice: Subject to any disclaimer, the term of this patent is extended or adjusted under 35 U.S.C. 154(b) by 126 days.

(21) Appl. No.: 17/180,936

(22) Filed: Feb. 22, 2021

(65) Prior Publication Data
US 2021/0261035 A1    Aug. 26, 2021

Related U.S. Application Data

(60) Provisional application No. 62/980,161, filed on Feb. 22, 2020.

(51) Int. Cl.
| | | |
|---|---|---|
| *B60J 5/10* | (2006.01) | |
| *B60P 7/15* | (2006.01) | |
| *B62D 63/08* | (2006.01) | |
| *B62D 33/04* | (2006.01) | |
| *B60P 1/64* | (2006.01) | |
| *B62D 25/02* | (2006.01) | |
| *E05D 3/02* | (2006.01) | |
| *B60P 3/07* | (2006.01) | |
| *B60Q 1/50* | (2006.01) | |
| *B60P 1/44* | (2006.01) | |
| *B60P 1/00* | (2006.01) | |

(52) U.S. Cl.
CPC ............... *B60P 7/15* (2013.01); *B60J 5/108* (2013.01); *B60P 1/00* (2013.01); *B60P 1/4464* (2013.01); *B60P 1/6409* (2013.01); *B60P 3/07* (2013.01); *B60Q 1/50* (2013.01); *B62D 25/02* (2013.01); *B62D 33/04* (2013.01); *B62D 33/046* (2013.01); *B62D 63/08* (2013.01); *E05D 3/02* (2013.01); *E05Y 2900/516* (2013.01); *E05Y 2900/531* (2013.01)

(58) Field of Classification Search
CPC .. B60P 7/15; B60P 1/00; B60P 1/4464; B60P 1/6409; B60P 3/07; B60J 5/108; B60Q 1/50; B62D 25/02; B62D 33/04; B62D 33/046; B62D 63/08; E05D 3/02; E05Y 2900/516; E05Y 2900/531
USPC ...................................................... 296/186.4
See application file for complete search history.

(56) References Cited

U.S. PATENT DOCUMENTS

| 4,650,381 A * | 3/1987 | Durkin | ................. | B65D 88/129 410/43 |
|---|---|---|---|---|
| 5,443,350 A * | 8/1995 | Wilson | ................. | B62D 53/062 414/495 |

(Continued)

*Primary Examiner* — Pinel E Romain
(74) *Attorney, Agent, or Firm* — George Pappas; Barrett McNagny LLP

(57) ABSTRACT

A transportation vessel includes a first sidewall and an opposing second sidewall. A load bar has a first end and a second end. The load bar is movable between a horizontal orientation and a vertical orientation. In the horizontal orientation, the first end is attached to the first sidewall and the second end is attached to the second sidewall, and the load bar may support cargo while the cargo is being transported in the transportation vessel. In the vertical orientation, the first end is attached to the first sidewall and the second end is unattached to the second sidewall.

20 Claims, 5 Drawing Sheets

(56) References Cited

U.S. PATENT DOCUMENTS

| | | | | |
|---|---|---|---|---|
| 6,755,600 | B2* | 6/2004 | Scott | B60P 7/15 410/151 |
| 8,118,525 | B2* | 2/2012 | Long | B60P 7/15 410/151 |
| 8,177,471 | B2* | 5/2012 | Nespor | B60P 3/055 414/544 |
| 2007/0163972 | A1* | 7/2007 | Sopel | B60P 7/08 211/60.1 |
| 2008/0038075 | A1* | 2/2008 | Aftanas | B60P 7/0815 410/150 |
| 2014/0369782 | A1* | 12/2014 | Reid | B60P 7/15 410/143 |
| 2016/0207441 | A1* | 7/2016 | Khan | B60P 7/15 |
| 2021/0261031 | A1* | 8/2021 | Bell | B62D 25/2054 |
| 2021/0261036 | A1* | 8/2021 | Bell | B62D 25/02 |

* cited by examiner

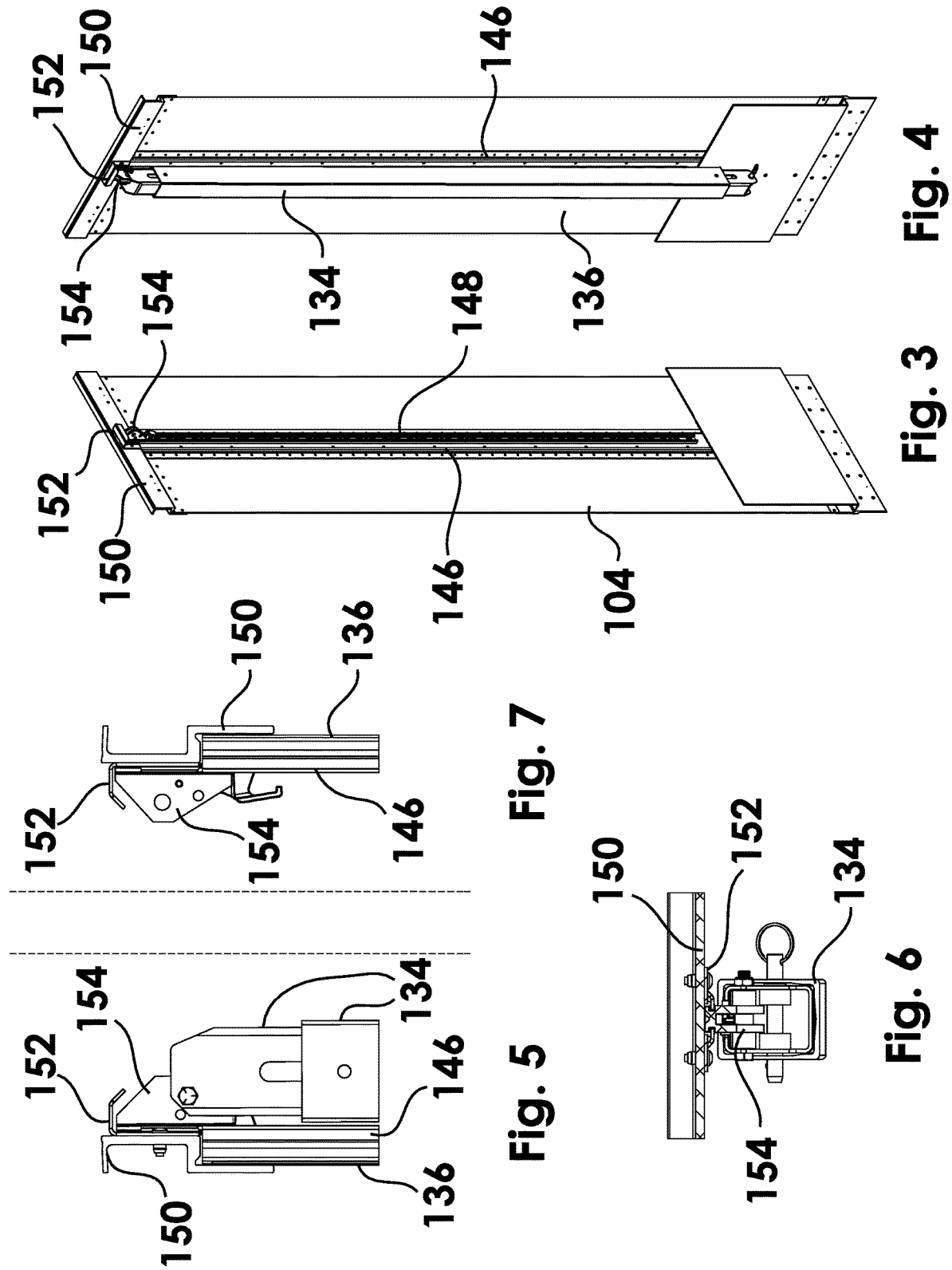

LOAD BAR FOR A TRUCK TRAILER

CROSS-REFERENCED TO RELATED APPLICATIONS

This application claims benefit of U.S. provisional application No. 62/980,161 filed on Feb. 22, 2020, the disclosure of which is hereby incorporated by reference in its entirety for all purposes.

SUMMARY

In one embodiment, a plurality of load bars extend horizontally between, and are attachable to, the sidewalls of the trailer, container or truck body. A subset of the load bars are at a same vertical level such that they can support a platform (e.g., a pallet) that supports cargo. One end of the load bar is releasably attached to one sidewall, and the other end of the load bar is pivotably attached to the opposite sidewall. When the load bar is at a high enough level, the releasably attached end may be freed from the sidewall and swung down such that the bar is vertically oriented in a position parallel to and adjacent the opposite sidewall. In this vertical position, the bar is out of the way for maximum clear opening height for loading cargo. The ability to store the load bar in a vertical position adjacent a trailer sidewall enables the load bar to be used in any area of the interior of a trailer that otherwise, due to overhead clearances, the could not be The invention comprises, in a further form thereof, a trailer, container or truck body including a first sidewall and an opposing second sidewall. A load bar has a first end and a second end. The load bar is movable between a horizontal orientation and a vertical orientation. In the horizontal orientation, the first end is attached to the first sidewall and the second end is attached to the second sidewall, and the load bar may support cargo while the cargo is being transported in the trailer, container or truck body. In the vertical orientation, the first end is attached to the first sidewall and the second end is unattached to the second sidewall.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 3 is a left overhead fragmentary perspective view of the interior side of a sidewall of a trailer of the present invention;

FIG. 4 is a right overhead fragmentary perspective view of the interior side of the sidewall of a trailer of the present invention;

FIG. 5 is a left side view of an upper end of the post and load bar of FIG. 4;

FIG. 6 is an overhead view of the load bar guide and stop bracket (LBGSB), slidable piece, and load bar of FIG. 5;

FIG. 7 is a right-side view of an upper end of the post of FIG. 3;

Figure 1A:
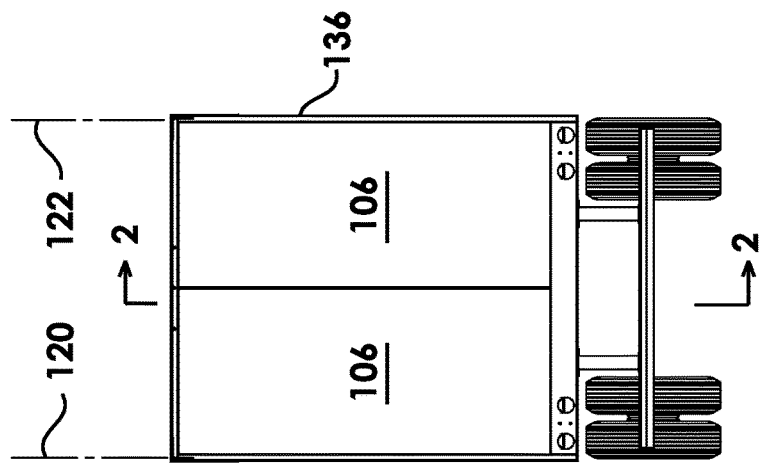
FIG. 1a is a rear view of the trailer of FIG. 1.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 1:
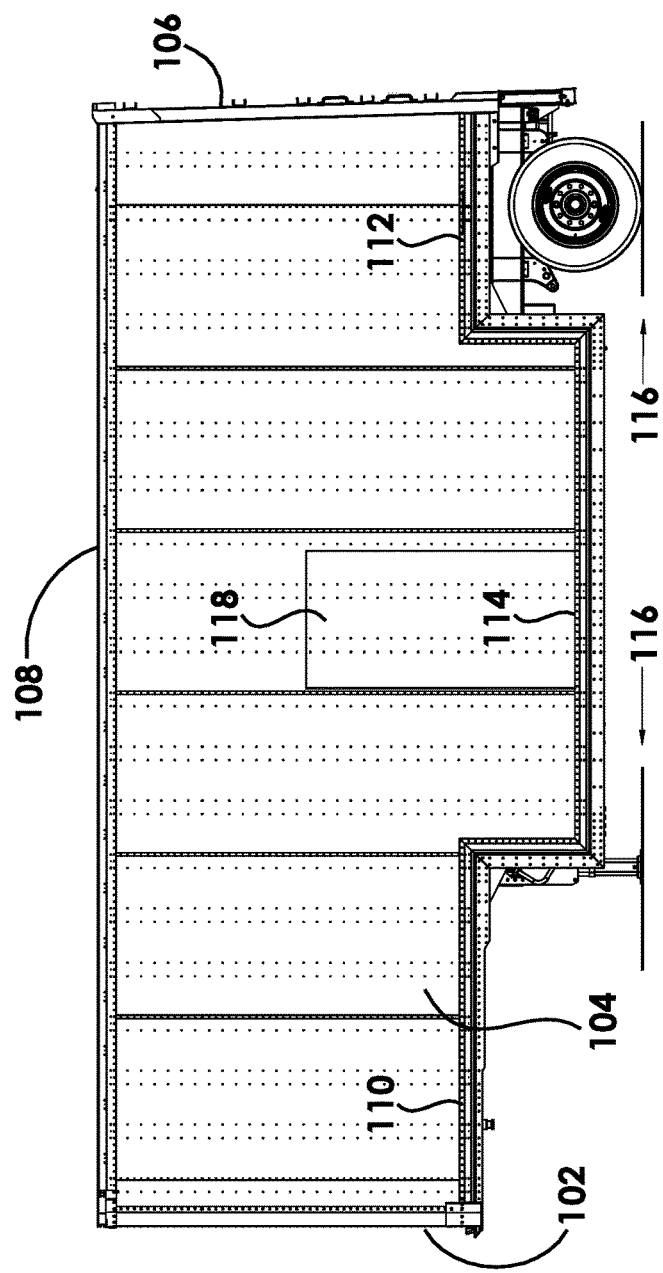
FIG. 1 is a side view of one embodiment of a trailer of the present invention.

Referring to the drawings, wherein like numerals indicate like elements, FIG. 1 illustrates a side view of one embodiment of a trailer 100 of the present invention. Trailer 100 includes a front wall 102, a left sidewall 104, one or two rear doors 106, a roof sheet 108, a forward main floor section 110, a rear main floor section 112, and a middle curb-level floor section 114. The space in trailer 100 above middle curb-level floor section 114 and below the vertical level of main floor sections 110, 112 may be referred to herein as the "belly" of trailer 100. Forward main floor section 110 and rear main floor section 112 may both be about 49 inches above a street level 116 to facilitate loading and unloading of trailer 100 from and onto a standard-height loading dock. Middle curb-level floor section 114 may be less than, or no more than, one foot above street level 116 to facilitate loading and unloading of trailer 100 from and onto a standard-height curb.

A door 118 may be provided in sidewall 104 above middle curb-level floor section 114. Cargo may be loaded into and out of the belly of trailer 100 at curb-height through door 118. Door 118 is shown in a closed position such that the belly and the remainder of the interior space of trailer 100 may be enclosed during transport. However, door 118 may be moved to an open position for loading cargo into and out of the belly of trailer 100.

FIG. 1a is a rear view of trailer 100. Doors 106 may each swing open about respective axes 120, 122.

Figure 2:
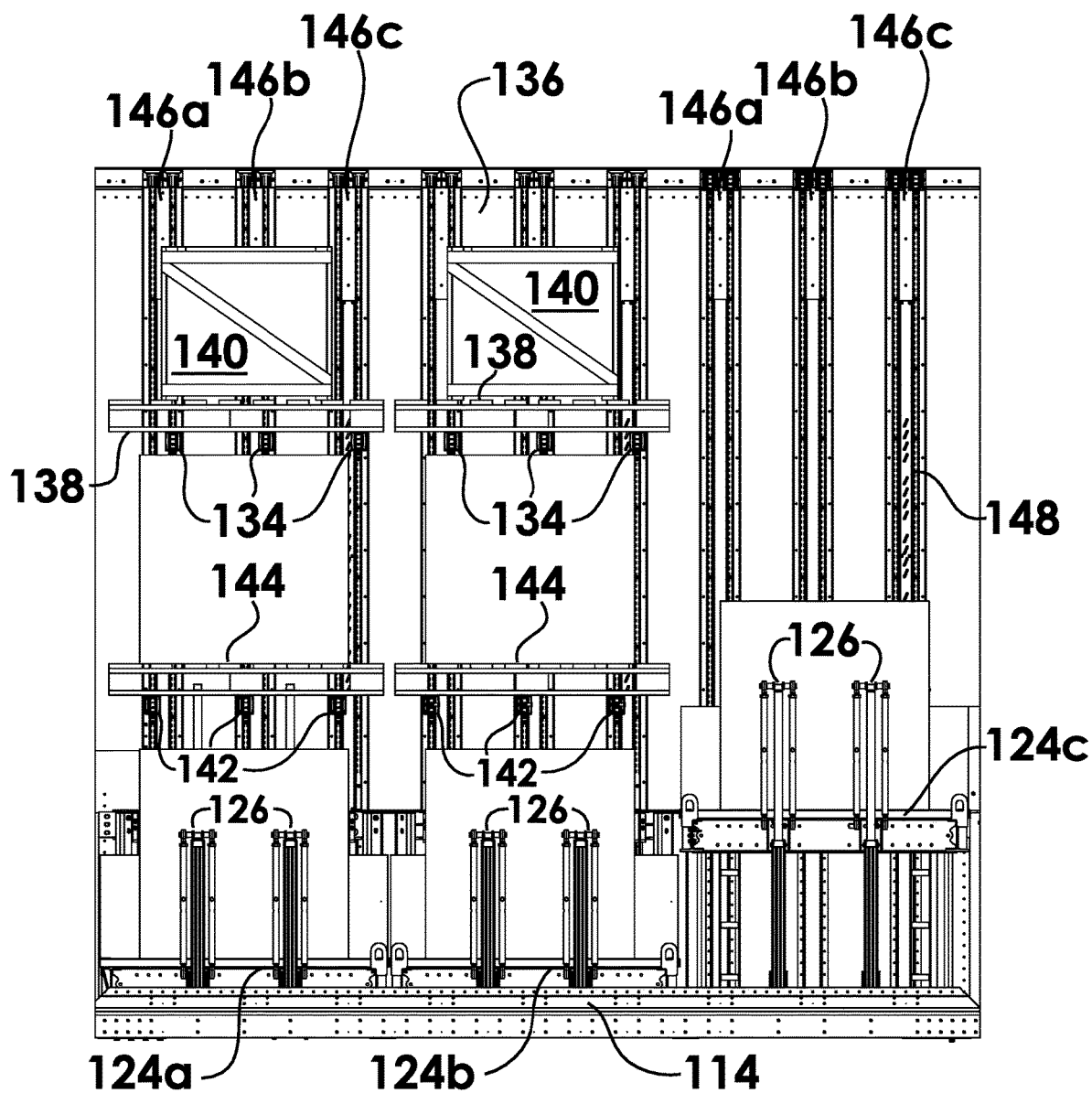
FIG. 2 is a fragmentary side sectional view of the trailer of FIG. 1a along line 2-2.

FIG. 2 illustrates the middle section of trailer 100 above middle curb-level floor section 114 along line 2-2 of FIG. 1a. Immediately above middle curb-level floor section 114 are three elevator assemblies each including a respective one of elevatable platforms 124a-c which are aligned from the front to the rear of the middle section of trailer 100. Each of platforms 124a-c may be individually raised or lowered by a respective set of four lifting devices 126. Only two lifting devices 126 are visible in FIG. 2 as being associated with each of platforms 124a-c on the lefthand side of each of platforms 124a-c. Lifting devices 126 may include electric, hydraulic, pneumatic and/or mechanical components, screws, liquids and/or gasses.

Load bars 134 each have a left end latched onto left sidewall 104 and a right end latched onto an opposing right sidewall 136 such that load bars 134 may support freight or cargo 138, 140 at uppermost positions within trailer 100. Other load bars 142 each have a left end latched onto left sidewall 104 and a right end latched onto right sidewall 136 such that load bars 142 may support freight or cargo 144 at middle or intermediate vertical levels within trailer 100.

As shown in FIG. 2, right sidewall 136 has a respective set of three vertical posts 146a-c associated with and laterally adjacent each of platforms 124a-c.

FIG. 3 illustrates a portion of the interior side of sidewall 104 including a vertical post 146, which may be any of posts 146a-c. Post 146 includes a central track 148 that ends at a top rail 150. A load bar guide and stop bracket (LBGSB) 152 is attached to top rail 150 and functions as an extension of track 148. A slidable piece 154 slidably rides within track 148.

FIG. 4 illustrates the interior side of sidewall 136 with a load bar 134 attached, and with load bar 134 in a vertical position. Slidable piece 154 is pivotably attached to load bar 134 and thus couples load bar 134 to track 148. LBGSB 152 may prevent load bar 134 and slidable piece 154 from running into roof sheet 108 (FIG. 1) and keep slidable piece 154 and load bar 134 in line with and engaged with the captive beam track 148 below top rail 150.

FIG. 5 illustrates an upper end of post 146 and load bar 134.

FIG. 6 illustrates LBGSB 152, slidable piece 154, and load bar 134.

FIG. 7 illustrates an upper end of post 146 and sidewall 136, including top rail 150, load bar guide and stop bracket (LBGSB) 152 and slidable piece 154.

Figure 8:
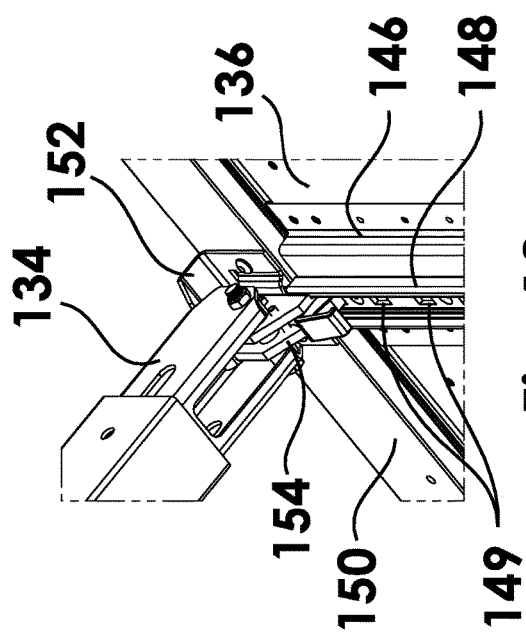
FIG. 8 is a right side overhead fragmentary perspective view of the interior side of the sidewall of FIG. 4 with a load bar attached and in a horizontal, load-bearing position.

FIG. 8 illustrates the interior side of sidewall 136 with a load bar 134 attached and pivoted into a horizontal, load-bearing position. Load bar 134 includes a planar surface 135 that faces up when load bar 134 is in a horizontal orientation. Planar surface 135 supports and interfaces with a high level of friction with a planar lower surface of a cargo container that is supported by load bar 134.

Figure 10:
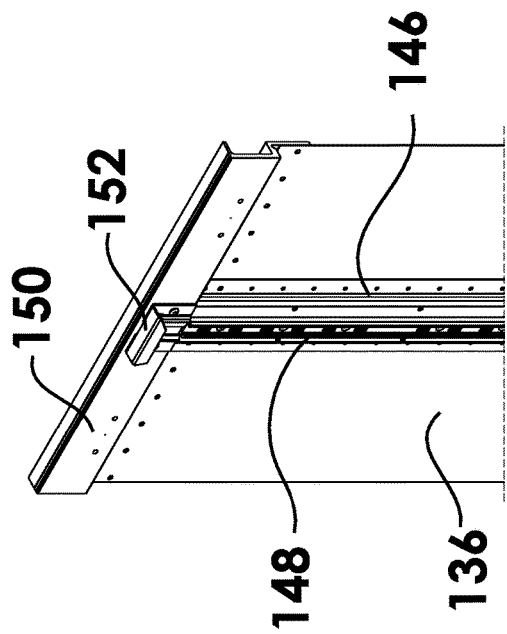
FIG. 10 is an enlarged right-side underside fragmentary perspective view of the joint between the load bar and post of FIG. 8.
Figure 9:
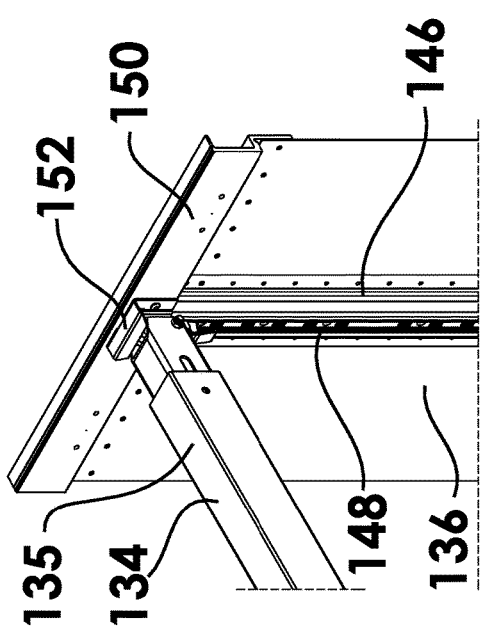
FIG. 9 is an enlarged right-side overhead perspective view of the joint between the load bar and post of FIG. 8.

FIGS. 9 and 10 are enlarged illustrations of the joint between load bar 134 and post 146. FIG. 10 is an enlarged right-side underside fragmentary perspective view of the joint between the load bar and post of FIG. 8. track 148 includes notches 149 aligned along the height of posts 146. Notches 149 are aligned with track 148 such that notches 149 are exposed within track 148. Slidable piece 154 may be partially inserted within a notch 149 such that load bar 134 may be vertically supported by the notch 149. When two slidable pieces 154 on respective opposite ends of a load bar 134 are inserted into respective notches 149 that are at the same vertical level on opposing track 148, the load bar 134 may be supported by posts 146 and fixed in a horizontal orientation.

Figure 11:
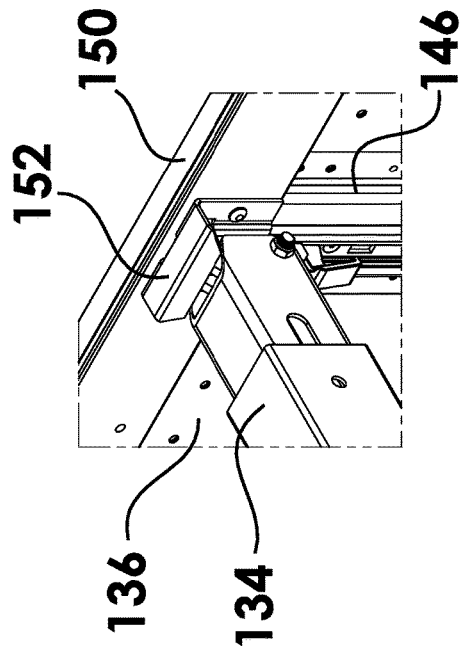
FIG. 11 is a right side overhead fragmentary perspective view of the interior side of the sidewall of FIG. 3.

FIG. 11 illustrates the interior side of the sidewall 136 and top rail 150 including post 146 and LBGSB 152.

Figure 13:
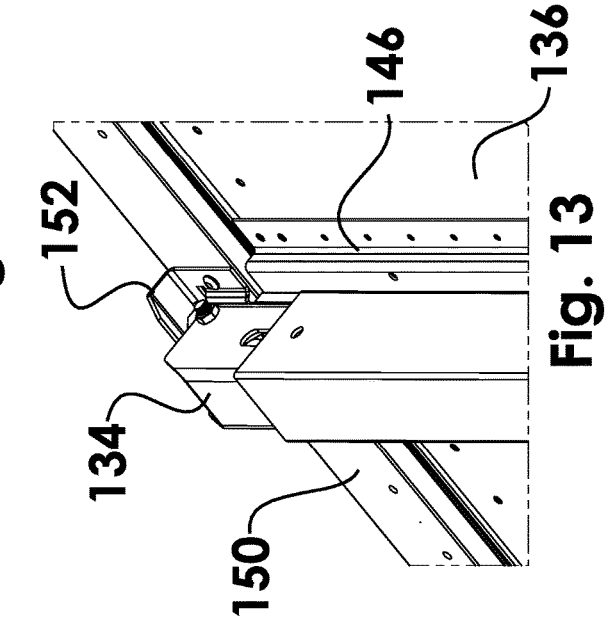
FIG. 13 is another enlarged right side underside perspective view of the joint between the load bar and post of FIG. 4, at a more upward angle that in FIG. 12.
Figure 12:
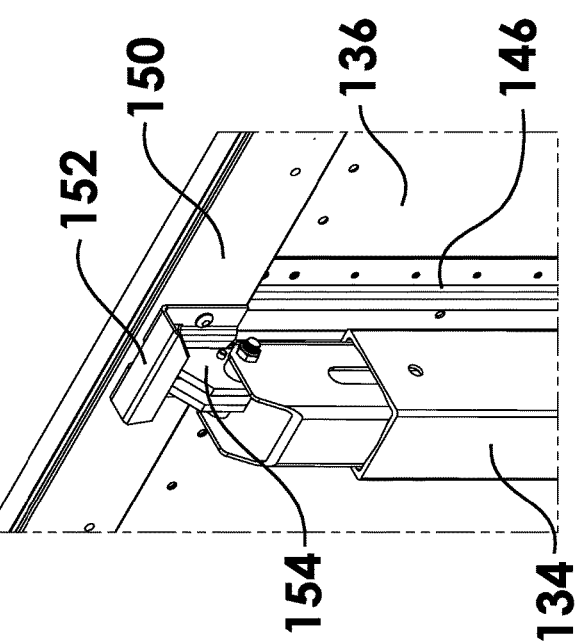
FIG. 12 is an enlarged right-side overhead perspective view of the joint between the load bar and post of FIG. 4.

FIGS. 12 and 13 are illustrations of the joint between load bar 134 and post 146 with load bar 134 in a vertical position.

Figure 15:
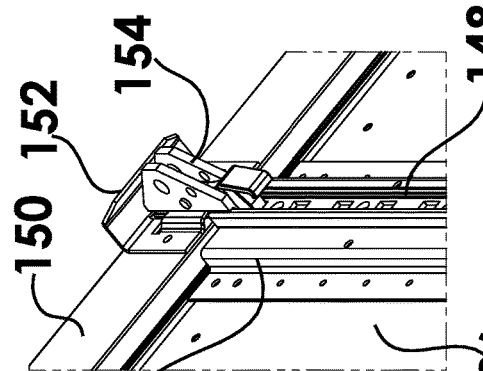
FIG. 15 is an enlarged left side underside perspective view of the upper end of the post of FIG. 3.
Figure 14:
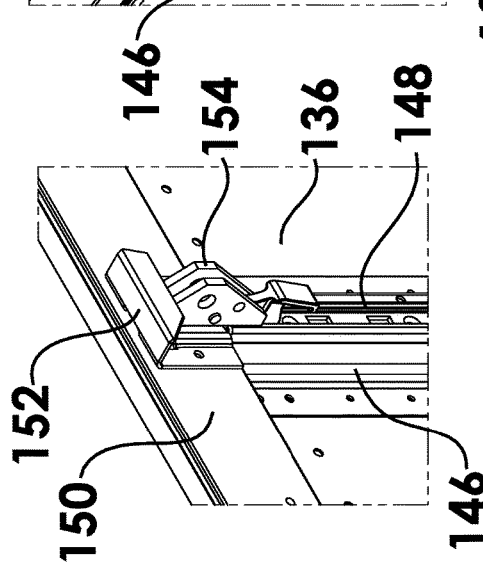
FIG. 14 is an enlarged left side overhead perspective view of the upper end of the post of FIG. 3.

FIGS. 14 and 15 are enlarged illustrations of the upper end of post 146, top rail 150, slidable piece 154 and LBGSB 152.

Figure 16:
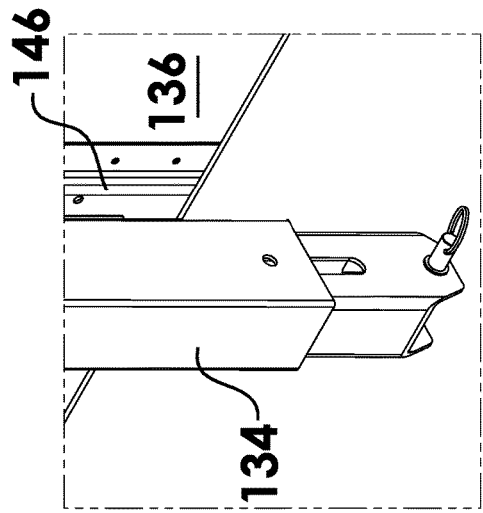
FIG. 16 is a right-side overhead perspective view of a lower end of the post and load bar of FIG. 4.

FIG. 16 illustrates a lower end of post 146 and load bar 134, with load bar 134 in the vertical position and the lower end of load bar 134 being unattached to left sidewall 104. Although the load bars have been described herein as being attached to right sidewall 136 and unattached to left sidewall 104, it should be understood that this is only an example, and the load bar may also be unattached to right sidewall 136 and attached to left sidewall 104 within the scope of the invention.

The invention may be applied to a trailer, container or truck body. Trailers, containers or truck bodies may be conjunctively referred to herein as "transportation vessels".

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A transportation vessel, comprising:
   a first sidewall and an opposing second sidewall; and
   a load bar having a first end and a second end, the load bar being movable between:
      a horizontal orientation in which the first end is attached to the first sidewall and the second end is attached to the second sidewall, and in which the load bar is configured to support cargo while the cargo is being transported in the transportation vessel; and
      a vertical orientation in which the first end is attached to the first sidewall and the second end is unattached to the second sidewall.

2. The transportation vessel of claim 1, wherein the first end of the load bar is pivotably attached to the first sidewall.

3. The transportation vessel of claim 1, further comprising a plurality of first vertical posts attached to the first sidewall and a plurality of second vertical posts attached to the second sidewall, each said vertical post including a vertical track, the first end of the load bar being coupled to the track in one of the first posts such that the first end of the load bar is vertically slidable within the first track.

4. The transportation vessel of claim 3, further comprising a plurality of first notches in a first said vertical track on the first sidewall and a plurality of second notches in a second said vertical track on the second sidewall, the first end of the load bar being latched in one of the first notches and the second end of the load bar being latched in one of the second notches when the load bar is in the horizontal orientation.

5. The transportation vessel of claim 4, wherein the first notches are vertically aligned, and the second notches are vertically aligned.

6. The transportation vessel of claim 4, wherein each of the notches is laterally aligned with the track of an associated post.

7. The transportation vessel of claim 1, wherein the load bar is adjacent the first sidewall when in the vertical orientation.

8. A transportation vessel, comprising:
a first sidewall having a vertical track associated therewith;
a second sidewall opposing the first sidewall; and
a load bar having a first end and a second end, the first end being retained in and slidable within the vertical track, the load bar being movable between:
  a horizontal orientation in which the first end is attached to the first sidewall and the second end is attached to the second sidewall, and in which the load bar is configured to support cargo while the cargo is being transported in the transportation vessel; and
  a vertical orientation in which the first end is attached to the first sidewall and the second end is unattached to the second sidewall.

9. The transportation vessel of claim 8, wherein the first end of the load bar is pivotably attached to the first sidewall.

10. The transportation vessel of claim 8, wherein the first end of the load bar is retained in the track while the first end of the load bar is attached to the first sidewall.

11. The transportation vessel of claim 8, wherein the first sidewall has a plurality of vertically aligned notches associated therewith, the first end of the load bar being latched in one of the notches when the load bar is in the horizontal orientation.

12. The transportation vessel of claim 11, wherein the notches are laterally aligned with the vertical track.

13. The transportation vessel of claim 8, wherein the load bar is adjacent the first sidewall when in the vertical orientation.

14. The transportation vessel of claim 8, wherein the load bar includes a planar surface that faces upward when the load bar is in the horizontal orientation.

15. A transportation vessel, comprising:
a first sidewall having a first vertical track associated therewith;
a second sidewall opposing the first sidewall and having a second vertical track associated therewith; and
a load bar having a first end and a second end, the first end being retained in and slidable within the first vertical track, the second end being retained in and slidable within the second vertical track, the load bar being movable between:
  a horizontal orientation in which the first end is attached to the first sidewall and the second end is attached to the second sidewall, and in which the load bar is configured to support cargo while the cargo is being transported in the transportation vessel; and
  a vertical orientation in which the first end is attached to the first sidewall and the second end is unattached to the second sidewall.

16. The transportation vessel of claim 15, wherein the first end of the load bar is pivotably attached to the first sidewall.

17. The transportation vessel of claim 15, wherein the first end of the load bar is retained in the first track while the first end of the load bar is attached to the first sidewall, and the second end of the load bar is retained in the second track while the second end of the load bar is attached to the second sidewall.

18. The transportation vessel of claim 15, wherein the first sidewall has a plurality of vertically aligned notches associated therewith, the first end of the load bar being latched in one of the notches when the load bar is in the horizontal orientation.

19. The transportation vessel of claim 18, wherein the notches are laterally aligned with the first vertical track.

20. The transportation vessel of claim 15, wherein the load bar is adjacent the first sidewall when in the vertical orientation.

* * * * *